(12) United States Patent
Su et al.

(10) Patent No.: US 11,757,157 B2
(45) Date of Patent: Sep. 12, 2023

(54) CAP ASSEMBLY AND SECONDARY BATTERY

(71) Applicant: Contemporary Amperex Technology Co., Limited, Fujian (CN)

(72) Inventors: Huasheng Su, Ningde (CN); Shoujun Huang, Ningde (CN); Xinxiang Chen, Ningde (CN); Yulian Zheng, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 112 days.

(21) Appl. No.: 17/478,888

(22) Filed: Sep. 18, 2021

(65) Prior Publication Data
US 2022/0006145 A1 Jan. 6, 2022

Related U.S. Application Data

(63) Continuation of application No. PCT/CN2020/080428, filed on Mar. 20, 2020.

(30) Foreign Application Priority Data

Apr. 1, 2019 (CN) .......................... 201920426787.6

(51) Int. Cl.
*H01M 50/528* (2021.01)
*H01M 50/591* (2021.01)
(Continued)

(52) U.S. Cl.
CPC ....... *H01M 50/528* (2021.01); *H01M 50/147* (2021.01); *H01M 50/562* (2021.01);
(Continued)

(58) Field of Classification Search
CPC ............. H01M 50/528; H01M 50/591; H01M 50/562; H01M 50/147; H01M 50/176; H01M 50/55; H01M 50/553
See application file for complete search history.

(56) References Cited

U.S. PATENT DOCUMENTS

2014/0315056 A1 10/2014 Guen et al.
2019/0386263 A1* 12/2019 Bai ....................... H01M 50/50

FOREIGN PATENT DOCUMENTS

CN 207233789 U 4/2018
CN 207233790 U 4/2018
(Continued)

OTHER PUBLICATIONS

The extended European search report for EP Application No. 20783509.1, dated Apr. 14, 2022, 7 pages.
(Continued)

*Primary Examiner* — Jane J Rhee
(74) *Attorney, Agent, or Firm* — East IP P.C.

(57) ABSTRACT

The present disclosure relates to a cap assembly and a secondary battery. The cap assembly includes a cap plate, an electrode terminal, a fixing member and a connection member. The cap plate includes an electrode lead-out hole, the electrode terminal includes a terminal board, the terminal board is located at a side of the cap plate and covers the electrode lead-out hole, the fixing member at least partially surrounds the terminal board to fix the terminal board to the fixing member, the connection member is separated from the electrode terminal by the fixing member, and the connection member is connected with the cap plate. The connection member includes a main body, the main body is provided with a first groove opened downwardly along a top of the main body, and a part of the fixing member is located in the first groove.

20 Claims, 5 Drawing Sheets

(51) Int. Cl.
    *H01M 50/147*    (2021.01)
    *H01M 50/562*    (2021.01)
    *H01M 50/176*    (2021.01)
    *H01M 50/553*    (2021.01)
    *H01M 50/55*    (2021.01)

(52) U.S. Cl.
    CPC ........ *H01M 50/591* (2021.01); *H01M 50/176* (2021.01); *H01M 50/55* (2021.01); *H01M 50/553* (2021.01)

(56) References Cited

FOREIGN PATENT DOCUMENTS

| | | |
|---|---|---|
| CN | 108767143 A | 11/2018 |
| CN | 108963122 A | 12/2018 |
| CN | 208385464 U | 1/2019 |
| CN | 208478389 U | 2/2019 |
| CN | 208622794 U | 3/2019 |
| CN | 209496906 U | 10/2019 |
| EP | 3582283 A1 | 12/2019 |

OTHER PUBLICATIONS

The International search report for PCT Application No. PCT/CN2020/080428, dated Jun. 2, 2020, 13 pages.

\* cited by examiner

CAP ASSEMBLY AND SECONDARY BATTERY

CROSS REFERENCE TO RELATED APPLICATION

The present application is a continuation of International Application No. PCT/CN2020/080428, filed on Mar. 20, 2020, which claims priority to Chinese Patent Application No. 201920426787.6, filed on Apr. 1, 2019, titled with "CAP ASSEMBLY AND SECONDARY BATTERY", both of which are hereby incorporated by reference in their entireties.

TECHNICAL FIELD

The present disclosure relates to a technical filed of energy storage devices, and particularly relates to a cap assembly and a secondary battery.

BACKGROUND

With the gradual popularity of new energy vehicles, the demand for a power battery is increasing. In order to improve the product competitiveness of the battery, requirements of the space utilization rate inside the battery and the cost of the battery are getting higher and higher.

Currently, a housing of a secondary battery includes a case and a cap assembly. The housing of the secondary battery is provided with an enclosed space to accommodate an electrode assembly and an electrolyte. The power of the electrode assembly is led out to an outside of the sealed space from inside of the sealed space through a terminal of the cap assembly. In the existing cap assembly, a cap plate is a metal plate and a through hole is arranged and opened on the cap plate. The terminal can be divided into a base portion and an extension portion, and the base portion has a cross-sectional area larger than that of the through hole. During assembly, the base portion is located below the cap plate (i.e., inside the case). After the extension portion passes through the through hole, the extension portion is fixed by a snap spring or a rivet connection. In this way, the terminal is fixed to the cap plate. As the base portion is located inside the case, space utilization rate within the case is reduced, and as a result, the energy density of the power battery is reduced.

Since a structure of the terminal itself and an assembly process are complicated, not only the assembly efficiency of the secondary battery will be affected, but also the phenomenon of disconnection between the terminal and the cap plate often occurs due to an insufficient fixing strength after the terminal is fixed to the cap plate, thereby reducing an operation reliability of the secondary battery.

SUMMARY

The present disclosure provides a cap assembly and a secondary battery to solve the problems in the prior art and improve the connection stability of a battery.

A first aspect of the present disclosure provides a cap assembly for a secondary battery, including:

a cap plate, in which the cap plate includes an electrode lead-out hole;

an electrode terminal, in which the electrode terminal includes a terminal board, the terminal board is located at a side of the cap plate and covers the electrode lead-out hole;

a fixing member, in which the fixing member at least partially surrounds the terminal board to fix the terminal board to the fixing member;

a connection member, in which the connection member is separated from the electrode terminal by the fixing member, and the connection member is connected with the cap plate; the connection member comprises a main body, the main body is provided with a first groove formed downwardly along a top of the main body;

a part of the fixing member is located in the first groove.

A second aspect of the present disclosure provides the secondary battery, including:

a case, including an opening;

a bare cell, accommodated in the case; and the cap assembly as described above, in which the cap assembly covers the opening to enclose the bare cell within the case.

A third aspect of the present application provides an apparatus including the secondary battery according to any of the above embodiments, wherein the secondary battery is configured to provide power for the apparatus.

The technical solution provided by the present disclosure has at least the following beneficial effects:

in the cap assembly and the secondary battery provided by the present disclosure, the electrode terminal of the cap assembly is connected to the cap plate through the fixing member and the connection member. The first groove is arranged on the main body included in the connection member, so that a part of the fixing member is located in the first groove. In the cap assembly provided by the present disclosure, the terminal board is firmly fixed to the cap board through the connection member and the fixing member, which reduces the possibility of separation between the terminal board and the cap board, thereby improving the safety of a structure of the secondary battery. A structure of the first groove arranged and opened on the connection member solves a problem that a size is difficult to be controlled in a prior art. In addition, the structure can contribute to smooth flow of plastic during an injection molding process and improve the efficiency of the injection molding.

It should be understood that the above general description and the following detailed description are only exemplary and cannot limit the present disclosure.

BRIEF DESCRIPTION OF THE DRAWINGS

In order to more clearly illustrate the technical solutions of the embodiments of the present disclosure or the technical solutions in the prior art, the drawings to be used in the description of the embodiments of the present disclosure will be described briefly below. Obviously, the drawings in the following description are merely some embodiments of the present disclosure. For those skilled in the art, other drawings can also be obtained according to these drawings without the inventive labor.

Figure 1:
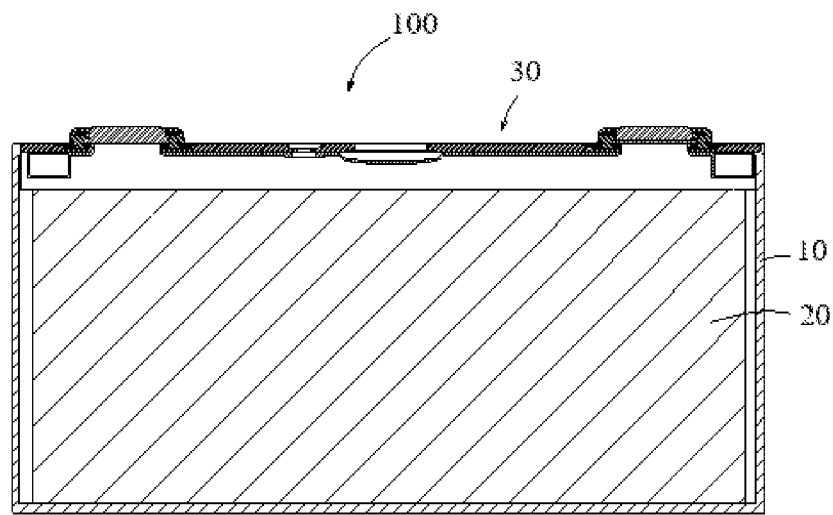
FIG. 1 shows a main cross-sectional view of a structure of a secondary battery according to an embodiment of the present disclosure.

In the drawings:
100—secondary battery;
10—case;
20—bare cell;
21—tab;
30—cap assembly;
31—cap plate; 311—electrode lead-out hole
32—terminal board; 321—second flange; 322—second groove;
33—fixing member; 331—isolation portion; 332—peripheral portion;
34—connection member; 341—main body; 341a—base portion; 341b—first flange;
341c—first groove; 342—third flange;
35—insulation plate;
36—sealing member;
40—adapter plate.

The drawings here are incorporated into the description and constitute a part of the description, show the embodiments that conform to the present disclosure, and are used to explain the principle of the present disclosure together with the description.

DETAILED DESCRIPTION

The technical solutions of the embodiments of the present disclosure will be clearly and completely described below in conjunction with the drawings of the embodiments of the present disclosure. It is apparent that the described embodiments are a part of the embodiments of the present disclosure, and not all of them. Based on the described embodiments of the present disclosure, all other embodiments obtained by those skilled in the art fall within the scope of the disclosure.

Figure 2:
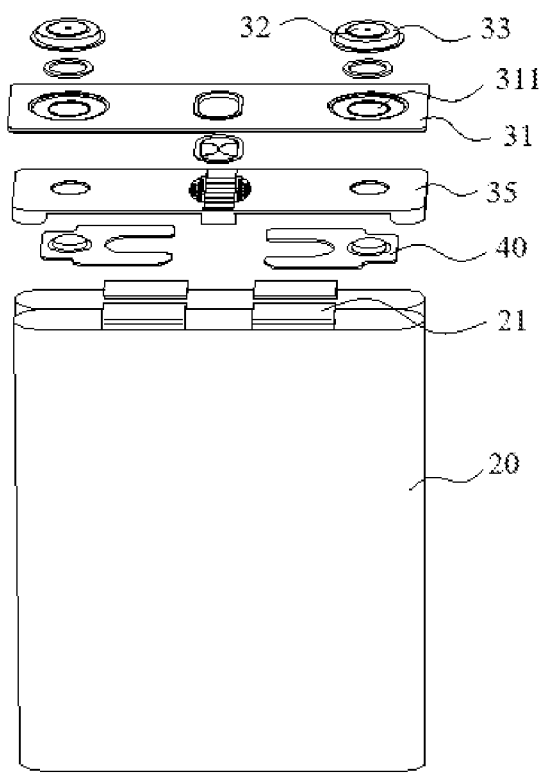
FIG. 2 shows an exploded view of a structure of a secondary battery according to an embodiment of the present disclosure.
Figure 3:
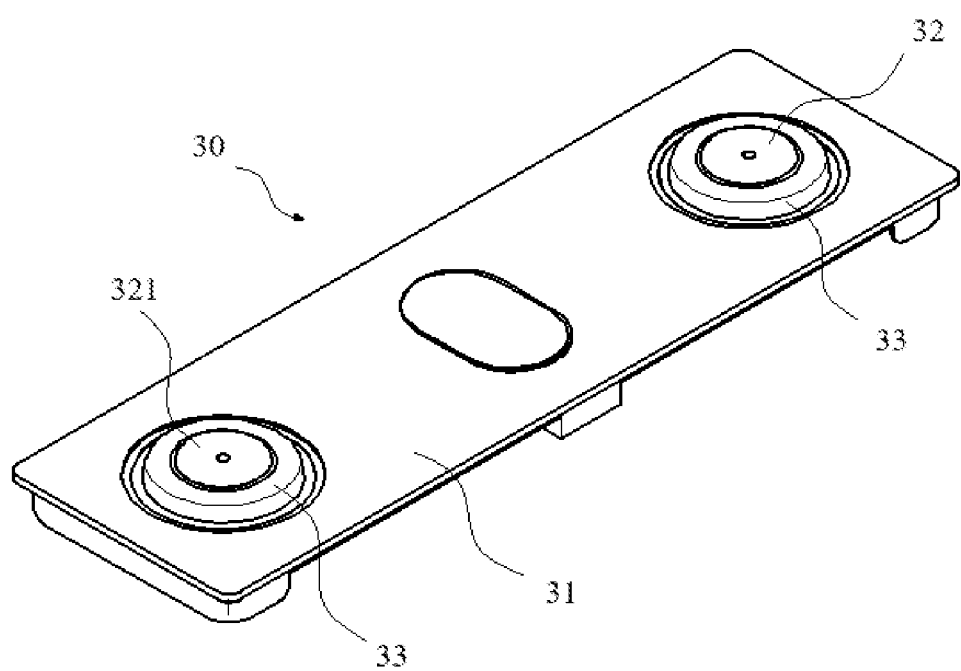
FIG. 3 shows a schematic view of a structure of a cap assembly according to an embodiment of the present disclosure.

As shown in FIG. 1 and FIG. 2, a secondary battery 100 is provided by an embodiment of the present disclosure, including a case 10, a bare cell 20 accommodated in the case 10, and a cap assembly 30 covering an opening of the case 10.

In the embodiment, the case 10 may be a hexahedral shape or other shapes. The case 10 has an inside space for accommodating the bare cell 20 and an electrolyte. The case 10 may be made of a material such as aluminum, aluminum alloy or plastic. As shown in FIG. 1, the case 10 has a cylindrical-like structure with the opening.

The bare cell 20 includes an electrode assembly. The electrode assembly may be formed by spirally winding a first electrode plate, a second electrode plate and a separator together around a winding axis. Herein, the separator is an insulator between the first electrode plate and the second electrode plate. In this embodiment, illustratively, for the purpose of description, the first electrode plate is a positive electrode plate, and the second pole piece is a negative electrode plate. Similarly, in other embodiments, the first electrode plate can be the positive electrode plate, while the second pole piece also can be the negative electrode plate. In addition, a positive electrode plate active material is coated on a coated area of the positive electrode plate, and a negative electrode plate active material is coated on a coated area of the negative electrode plate. As shown in FIG. 2, an uncoated area extending from a coated area of the main body serves as a tab 21. The electrode assembly includes two tabs 21, namely a positive tab and a negative tab. The positive tab extends from the coated area of the positive electrode plate, and the negative tab extends from the coated area of the negative electrode plate. The positive electrode plate is connected to a positive terminal on the cap assembly 30 through the positive tab, and the negative electrode plate is connected to a negative terminal on the cap assembly 30 through the negative tab. The tab 21 is connected to an electrode terminal through an adapter plate 40. Similarly, the adapter plate 40 may be a positive adapter plate and a negative adapter plate. The positive tab is connected to the positive terminal through the positive adapter plate, and the negative tab is connected to the negative terminal through the negative adapter plate.

As shown in FIGS. 3-6, the cap assembly 30 in the embodiment of the present disclosure includes a cap plate 31, the electrode terminal, a fixing member 33 and a connection member 34. The cap plate 31 includes an electrode lead-out hole 311. The electrode terminal includes a terminal board 32. The terminal board 32 is located at a side of the cap plate 31 and covers the electrode lead-out hole 311. The terminal board 33 and the electrode lead-out hole 311 may be sealed by a sealing member 36. The fixing member 33 at least partially surrounds the terminal board 32 to fix the terminal board 32 to the fixing member 33. The connection member 34 is separated from the electrode terminal by the fixing member 33, and the connection member 34 is connected with the cap plate 31. The connection member 34 includes a main body 341. The main body 341 is provided with a first groove 341c formed downwardly along a top of the main body 341. A part of the fixing member 33 is located in the first groove 341c. An insulation plate 35 may be further arranged at the side of the cap plate 31 facing to the case 10 to isolate the cap plate 31 from the bare cells 20 inside the case 10.

In the cap assembly 30 provided by the embodiment of the present disclosure, the electrode terminal are fixed to the cap plate 31 through the fixing member 33 and the connection member 34, so that the connection member 34 provides an effective fastening force for the fixing member 33 and the terminal board 32. The first groove 341c is arranged on the main body 341 of the connection member 34. The first groove 341c can be formed by a cutting process instead of a punching-hole process in a prior art, thus, a size is easy to be controlled, which facilitates the subsequent calculation of the strength of the electrode terminal. In addition, by means of providing a structure of the first groove 341c, the terminal board 32 and the connection member 34 can be made to have better fluidity of the plastic during an injection molding process, and improve the efficiency of the injection molding.

In addition, since the terminal board 32 is connected and fixed to the cap plate 31 from an outside of the cap plate 31 through the fixing member 33 and the connection member 34, a fixing structure of the electrode terminal located an inside of the case 10 can be omitted, which can effectively reduce a space occupation rate of the electrode terminal to an inside of the secondary battery 100, thereby increasing an energy density of the secondary battery 100.

In an embodiment, the terminal board 32 included in the electrode terminal has a sheet-like or plate-like structure. A shape of a part of the terminal board 32 surrounded by the fixing member 33 matches with a shape of the fixing member 33. The fixing member 33 is a ring-like structure and has an accommodation space adapted to the shape of the terminal board 32, so that the terminal board 32 can be accommodated in the accommodation space, an outer peripheral surface of the terminal board 32 can be at least partially surrounded by the fixing member 33, and the terminal board 32 can be fixed to the fixing member 33. It should be noted that the "fix" here refers to fix in a thickness direction of the cap plate 31. Since there is the cap plate 31 below the terminal board 32 for limiting position and fixing thereto, the fixing can be achieved as long as it is ensured that the terminal board 32 will not fall out of the cap plate 31.

In an embodiment, the terminal board 32 included in the electrode terminal may be a cylindrical-like structure. At this time, each of the fixing member 33 and the main body 341 of the connection member 34 is a revolving structure, and the accommodating space of each of the fixing member 33 and the main body 341 is a circular hole, so that a part of the terminal board 32 can be inserted into the accommodating space, and fit closely and contact with each other. In some embodiments, a second groove 322 is arranged on the terminal board 32 at a part that matches with the fixing member 33, so as to prevent the terminal board 32 from rotating in the above-mentioned accommodation space, which may cause the terminal board 32, the fixing member 33 and the connection member 34 to be separated with each other.

In another embodiment, the terminal board 32 included in the electrode terminal may be a quadrangular prism structure. Each of the fixing member 33 and the main body 341 of the connection member 34 is a rectangular structure, and the accommodating space of each of the fixing member 33 and the main body 341 is a square hole. Thus, the terminal board 32 is restrained by the main body 341 and cannot rotate, which reduces the possibility of the terminal board 32 being separated from the fixing member 33, the connection member 34 and the cap plate 31 due to the rotation of the terminal board 32, thereby improving a connection stability between the terminal board 32 and the fixing member 33, and between the connection member 34 and the cap plate 31

The embodiments of the present disclosure does not limit a connection manner among the terminal board 32, the fixing member 33 and the connection member 34. In an embodiment, the fixing member 33 is combined to an outer peripheral surface of the terminal board 32 by the integral injection molding. The fixing member 33 is made of a plastic material, and the terminal board 32, the connection member 34 and the cap plate 31 are made of a metal material. The terminal board 32 is engaged with the connection member 34 by the injection molding, and a solidified part of the plastic after the injection molding forms the fixing member 33. During the injection molding process, a part of the plastic fills the first groove 341c arranged on the main body 341. The connection member 34 is engaged with the fixing member 33 after the plastic entering the first groove 341c solidified. Thus, the fixing member 33 and the connection member 34 are formed as a whole, so that a connection strength between the fixing member 33 and the connection member 34 is high, and the connection stability is good. In some embodiments, the terminal board 32, the fixing member 33 and the connection member 34 can be formed as a whole, so that the connection stability between the terminal board 32 and the fixing member 33 can be increased. At the same time, the connection member 34 and the cap plate 31 can be fixed by welding, thereby improving an engaging strength and an engaging reliability of the connection member 34 and the cap plate 31.

In an embodiment, the fixing member 33 is made of a hard plastic member, for example, the fixing member 33 may be made of one or more materials selected from polyphenylene sulfide, perfluoroalkoxy resin and polypropylene. Thus, the fixing member 33 can be made of a high-temperature resistant insulating plastic material by means of the integrated injection molding, has high rigidity and is not prone to deformation. In another embodiment, when the fixing member 33 is used to fix the terminal board 32 with positive charge, the fixing member 33 may be made of a conductive plastic, for example, a conductive carbon is added to an insulating plastic material, so that the case 10 also can have positive charge, and the case 10 can be prevented from being corroded by the electrolyte.

The electrode terminal of this embodiment only consists of the terminal board 32, that is, all the electrode terminal are located on one side of the cap plate. In an embodiment, the terminal board 32 may be made of a copper alloy or an aluminum alloy, or may be formed of a copper-aluminum composite plate, for example, an upper layer is an aluminum plate and a lower layer is a copper plate.

Figure 6:
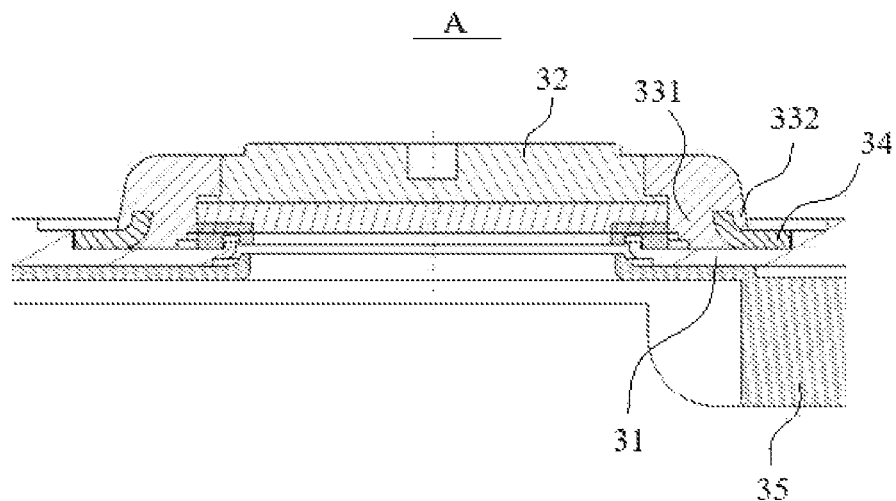
FIG. 6 shows an enlarged view of a portion A in FIG. 5.

In an embodiment, as shown in FIG. 6, the fixing member 33 includes an isolation portion 331 and a peripheral portion 332 connected to each other. The isolation portion 331 is located between the terminal board 32 and the main body 341 of the connection member 34 to isolate the main body 341 from the terminal board 32. The peripheral portion 332 is located at a side of the connection member 34 away from the terminal board 32, and the isolation portion 331 intersects with the peripheral portion 332 at the first groove 341c. Thus, on the one hand, a part of the main body 341 is completely wrapped by the isolation portion 331 and the peripheral portion 332, so that the fixing member 33 and the connection member 34 can form an integrated structure, and the connection between the two is stable; on the other hand, an intersection position of the isolation portion 331 and the peripheral portion 332 can tighten the isolation portion 331 and the peripheral portion 332, so that the isolation portion 331 and the peripheral portion 332 are in close contact with the main body 341. Therefore, either of the isolation portion 331 and the peripheral portion 332 cannot be easily displaced in a direction away from the main body 341 so as to prevent disconnection with the main body 341 from occurring, at the same time, the peripheral portion 332 is prevented from being warped and deformed in the direction away from the main body 341, which effectively improves the connection stability of the fixing member 33 and the connection member 34.

Figure 7:
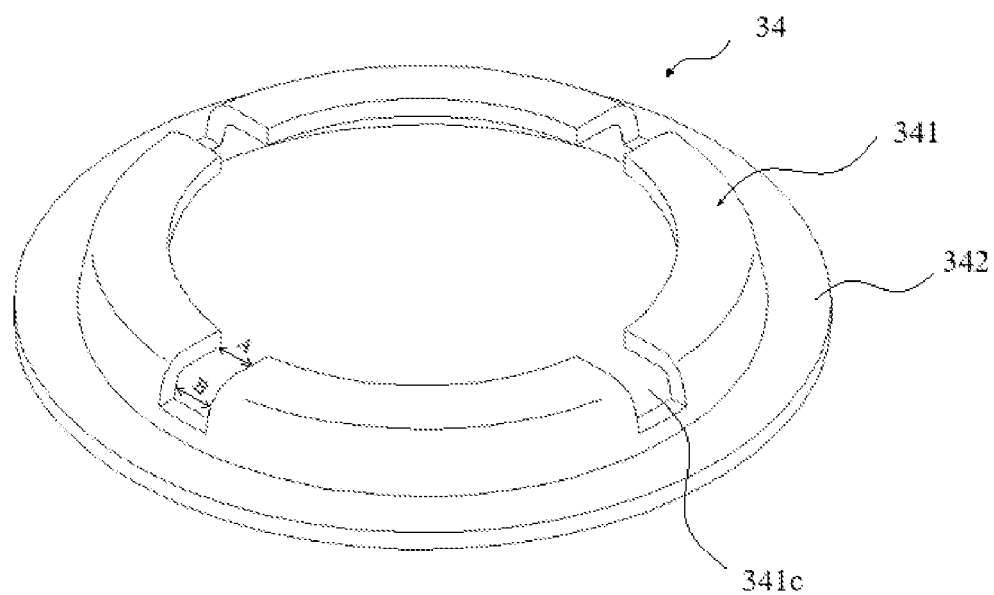
FIG. 7 shows a schematic view of a structure of a connection member in a cap assembly according to an embodiment of the present disclosure.
Figure 8:
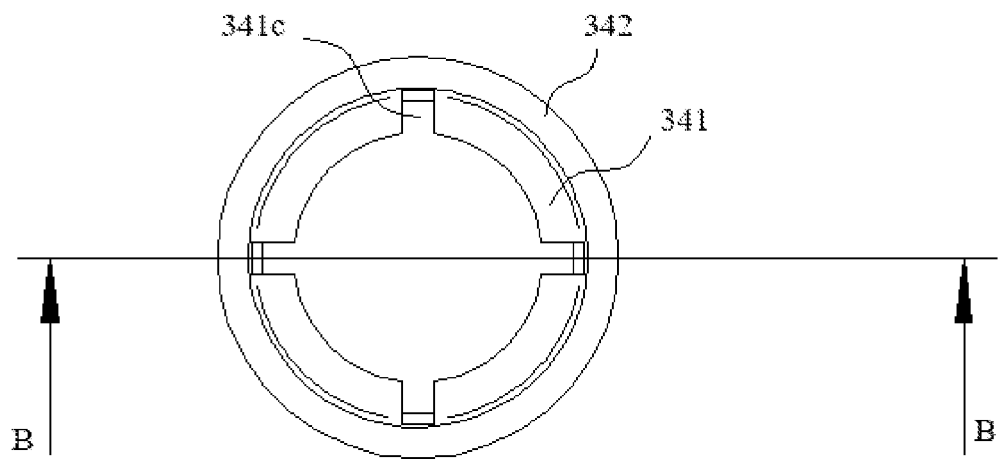
FIG. 8 shows a top view of a connection member in a cap assembly according to an embodiment of the present disclosure.
Figure 9:
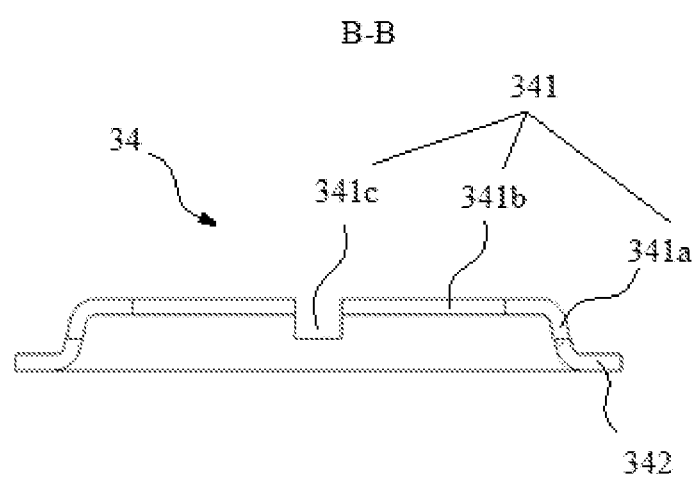
FIG. 9 shows a cross-sectional view taken along line B-B in FIG. 8.

As shown in FIGS. 7-9, in an embodiment, the main body 341 includes a cylinder-like base portion 341a and a ring-like first flange 341b. The first flange 341b extends from the base portion 341a in a direction toward the terminal board 32. The first groove 341c penetrates the first flange 341b, and at least partially extends onto the base portion 341a. When the fixing member 33 is manufactured by the injection molding, a part of the fixing member 33 fills a gap between an inside surface of the main body 341 and an outer circumference of the terminal board 32 to separate the main body 341 from the terminal board 32. A part of the fixing member 33 is filled in the first groove 341c, so that the connection member 34 and the fixing member 33 are engaged at a position of the first groove 341c, thereby improving a connection strength between the connection member 34 and the fixing member 33.

When an internal pressure of the secondary battery 100 increases, the cap plate 31 will be deformed under an action of the internal pressure, and a central part of the cap plate 31 in a width direction is deformed to a greater degree with respect to two sides of the cap plate 31 in the width direction. When the cap plate 31 is deformed, the fixing member 33 is pulled to deform at the same time, thereby reducing a sealing performance between the terminal board 32 and the cap plate 31. For example, when the secondary battery 100 is overcharged, an internal pressure of the secondary battery 100 will increase. Since the base portion 341a is a cylindrical-like structure and the base portion 341a is arranged around the terminal board 32, the fixing member 33 is limited and restrained by the base portion 341a in a circumferential direction of the fixing member 33, thereby reducing a deformation of the fixing member 33. When the cap plate 31 is deformed, the terminal board 32 can still be pressed on the cap plate 31, thereby reducing a possibility of a crack between the terminal board 32 and the cap plate 31, which can reduce a possibility of air leakage and liquid leakage at a connection position between the terminal board 32 and the cap plate 31.

In some embodiments, the first flange 341b extends from the base portion 341a in the direction toward the terminal board 32, and is configured to intersect with the base portion 341a. In an embodiment, as shown in FIG. 6, the first flange 341b is completely wrapped by the fixing member 33, the base portion 341a is at least partially wrapped by the fixing member 33, and the first groove 341c is completely covered by the fixing member 33. Under the limiting and restraining of the base portion 341a and the first flange 341b, the main body 341 included in the connection member 34 is not easily moved along a radial and/or axial direction of the electrode lead-out hole 311 relative to the fixing member 33, thereby reducing a possibility of the fixing member 33 and the connection member 34 being easily separated when the fixing member 33 or the connection member 34 is subjected to an external force. Optionally, the first flange 341b has the ring-like structure, and the first flange 341b is arranged around the cylindrical-like base portion 341a. Since the first flange 341b is bent at a certain angle with respect to the base portion 341a, an overall rigidity of the main body 341 is improved, thereby further increasing a deformation resistance of the fixing member 33.

In this embodiment, the first groove 341c penetrates the first flange 341b and the base portion 341a, and at least partially extends onto the base portion 341a. Thus, during the injection molding, the plastic can smoothly flow to an inside surface and an outside surface of the base portion 341a, so that the connection member 34 is engaged with the terminal board 32 and the fixing member 33, thereby improving an efficiency of the injection molding.

The above-described first groove 341c may have various shapes. In an embodiment, a projection of the first groove 341c on a plane of a top surface of the first flange 341b is a rectangular groove. In another embodiment, the projection of the first groove 341c on the plane of the top surface of the first flange 341b is a trapezoidal groove. In some embodiments, as shown in FIG. 7, a size A of a notch at an end of the first groove 341c on the first flange 341b away from the base portion 341a is larger than a size B of an opening of the first groove 341c on the base portion 341a. Thus, when the fixing member 33 is formed by the injection molding, the plastic in a fusion state can pass through the first groove 341c more smoothly, so as to fully fill a gap between the connection member 34 and the terminal board 32.

Figure 4:
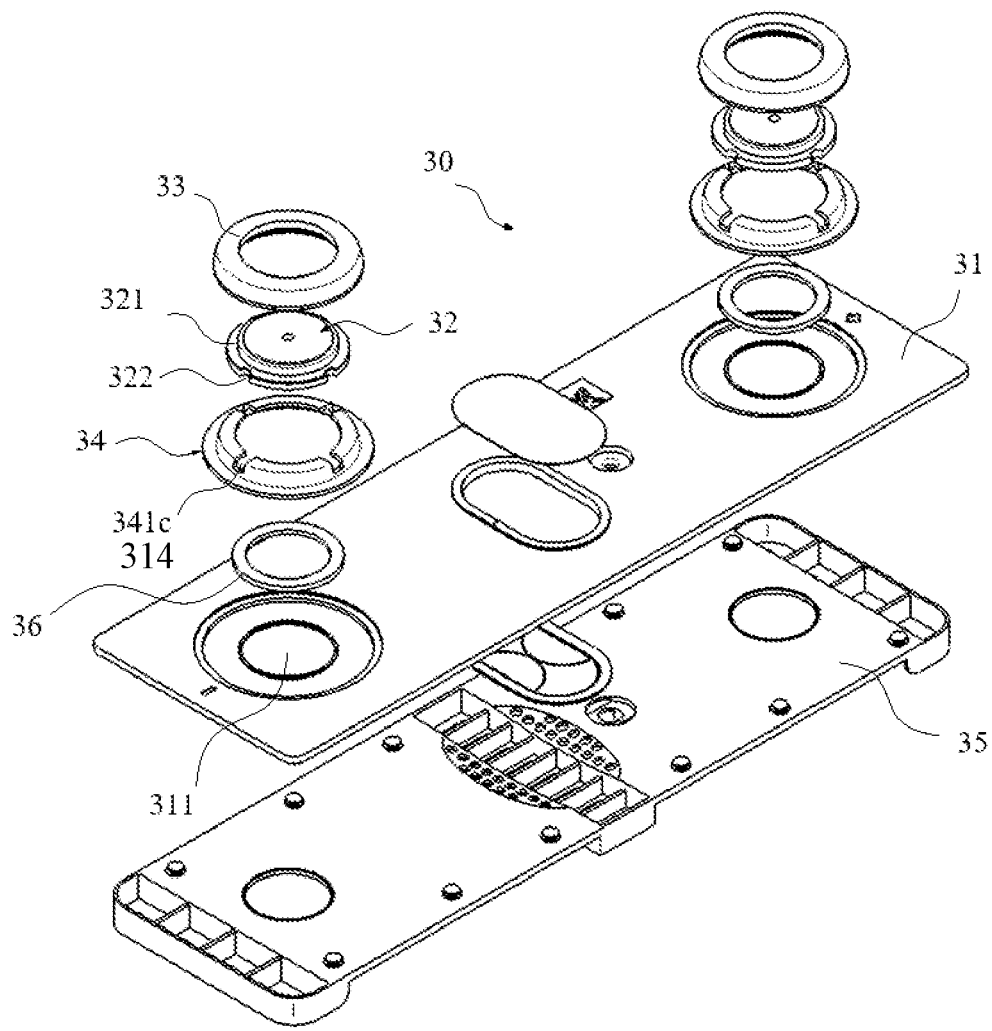
FIG. 4 shows an exploded view of a structure of a cap assembly according to an embodiment of the present disclosure.
Figure 5:
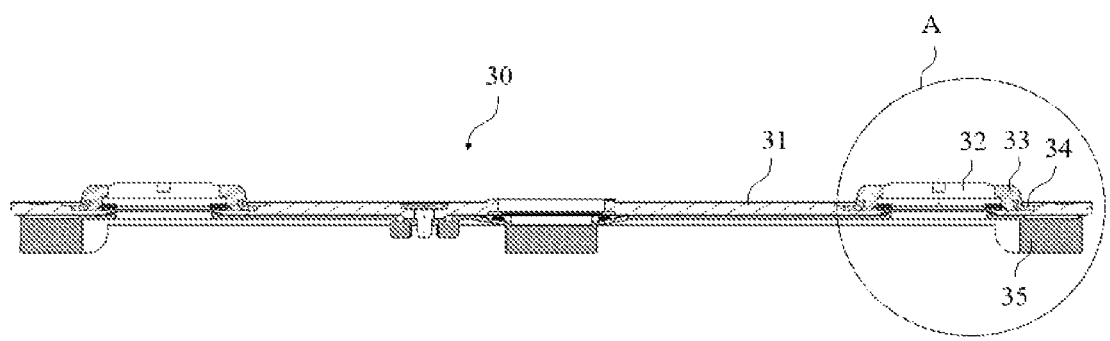
FIG. 5 shows a main cross-sectional of a structure of a cap assembly according to an embodiment of the present disclosure.

As mentioned above, the first flange 341b extends from the base portion 341a toward the terminal board 32. Further, as shown in FIG. 4, the electrode terminal is located at the side of the cap plate 31, and the electrode terminal includes a second flange 321 extending toward the main body 341. The second flange 321 is located at a side of the first flange 341b close to the cap plate 31, and in the axial direction of the electrode lead-out hole 311, a projection of the second flange 321 at least partially overlaps with a projection of the first flange 341b. Thus, after the connection member 34 is connected and fixed to the cap plate 31, the first flange 341b included in the connection member 34 applies a pressing force in the axial direction of the electrode lead-out hole 311 on the second flange 321 included in the electrode terminal, thereby reducing a possibility of the electrode terminal moving in the axial direction of the electrode lead-out hole 311 and causing the sealing failure at the electrode terminal, which can reduce a possibility of leakage of the secondary battery 100 at the electrode terminal. In an embodiment, each of the first flange 341b and the second flange 321 may have the ring-like structure. Since the first flange 341b and the second flange 321 are the ring-like structures, the pressing force of the first flange 341b on the fixing member 33 and the second flange 321 can be further increased.

In some embodiments, as shown in FIG. 4, the second groove 322 is formed in the second flange 321 in a direction toward the main body 341. By means of providing the second groove 322, after the injection molding, the second groove 322 is filled by the plastic, so that the electrode terminal and the connection member 34 are engaged at the second groove 322, thereby preventing the electrode terminal from rotating, reducing a possibility of the electrode terminal being separated from the fixing member 33, the connection member 34 and the cap plate 31 due to the rotation of the electrode terminal, and improving a stability of the electrode terminal being connected to the fixing member 33, the connection member 34 and the cap plate 31.

As shown in FIG. 7, the connection member 34 of the embodiment further includes a third flange 342 connected to the main body 341 and extending in a direction away from the electrode terminal. The third flange 342 is connected with the cap plate 31. The connection member 34 is welded to the cap plate 31 through the third flange 342, which improves a convenience of a connection operation between the connection member 34 and the cap plate 31 and a strength of a connection between the connection member 34 and the cap plate 31. An edge of the third flange 342 away from the main body 341 is not wrapped by the fixing member 33 so as to facilitate a welding operation between the edge of the third flange 342 and the cap plate 31. In an embodiment, the third flange 342 may be the ring-like structure, so that the third flange 342 may be connected to the cap plate 31 in a circumferential direction of the third flange 342. Thus, on the one hand, a deformation resistance of the cap plate 31 can be increased, on the other hand, a connection reliability between the connection member 34 and the cap plate 31 can be increased.

The secondary battery 100 is further provided by the embodiment of the present disclosure. The secondary battery 100 includes the cap assembly 30 of the embodiments as described above. The secondary battery 100 of the embodiment has a good overall sealing effect, and a situation of liquid leakage is unlikely to occur at the cap assembly 30, which can improve a reliability and a safety of its own during used. A processing size of the connection member 34 in the cap assembly 30 is easy to be controlled, which can provide a convenience for the subsequent calculation, and makes an efficiency of the injection molding of the cap assembly 30 higher.

The embodiments of the present disclosure further provide an apparatus, which includes the secondary battery 100 according to any of the embodiments as described above, and the secondary battery 100 is configured to provide power for the apparatus. The apparatus may be an electric vehicle, a hybrid vehicle, an electric scooter, an electric cart or any other suitable devices which can include the secondary battery 100 as their own power source.

The above descriptions are only the embodiments of the present disclosure, and are not used to limit the present disclosure. For those skilled in the art, the present disclosure may have various modifications and changes. Any modification, equivalent replacement, improvement, etc. made within the spirit and principle of the present disclosure should be included in the protection scope of the present disclosure.

What is claimed is:

1. A cap assembly for a secondary battery, comprising:
a cap plate, wherein the cap plate comprises an electrode lead-out hole;
an electrode terminal, wherein the electrode terminal comprises a terminal board, the terminal board is located at a side of the cap plate and covers the electrode lead-out hole;
a fixing member, wherein the fixing member at least partially surrounds the terminal board to fix the terminal board to the fixing member;
a connection member, wherein the connection member is separated from the electrode terminal by the fixing member, and the connection member is connected with the cap plate; the connection member comprises a main body, the main body is provided with a first groove formed downwardly along a top of the main body;
wherein a part of the fixing member is located in the first groove;
wherein the main body comprises a cylinder-like base portion and a ring-like first flange;
the first flange extends from the base portion in a direction toward the terminal board;
the first groove penetrates the first flange.

2. The cap assembly according to claim 1, wherein the first groove partially extends onto the base portion.

3. The cap assembly according to claim 1, wherein the base portion is at least partially wrapped by the fixing member, and the first groove is completely covered by the fixing member.

4. The cap assembly according to claim 1, wherein the base portion is configured to intersect with the first flange.

5. The cap assembly according to claim 1, wherein a projection of the first groove on a plane of a top surface of the first flange is a rectangular groove or a trapezoidal groove.

6. The cap assembly according to claim 5, wherein a size of a notch at an end of the first groove on the first flange away from the base portion is larger than a size of an opening of the first groove on the base portion.

7. The cap assembly according to claim 1, wherein the electrode terminal is located at the side of the cap plate, and the electrode terminal comprises a second flange extending toward the main body;
the second flange is located at a side of the first flange close to the cap plate, and in an axial direction of the electrode lead-out hole, a projection of the second flange at least partially overlaps with a projection of the first flange.

8. The cap assembly according to claim 7, wherein a second groove is formed in the second flange in a direction toward the main body.

9. The cap assembly according to claim 1, wherein the connection member further comprises a ring-like third flange connected to the main body and extending in a direction away from the electrode terminal, the third flange is connected with the cap plate.

10. The cap assembly according to claim 1, wherein the fixing member comprises an isolation portion and a peripheral portion connected to each other, the isolation portion is located between the terminal board and the main body of the connection member, the peripheral portion is located at a side of the connection member away from the terminal board, and the isolation portion intersects with the peripheral portion at the first groove.

11. The cap assembly according to claim 1, wherein a shape of a part of the terminal board surrounded by the fixing member matches with a shape of the fixing member.

12. The cap assembly according to claim 1, wherein an outer peripheral surface of the terminal board is at least partially surrounded by the fixing member.

13. The cap assembly according to claim 1, wherein the fixing member is made of a plastic material, and the terminal board, the connection member and the cap plate are made of a metal material.

14. The cap assembly according to claim 13, wherein the fixing member is combined to an outer peripheral surface of the terminal board by integrated injection molding.

15. A secondary battery, comprising:
a case, comprising an opening;
a bare cell, accommodated in the case; and
the cap assembly according to claim 1, wherein the cap assembly covers the opening to enclose the bare cell within the case.

16. The secondary battery according to claim 15, wherein the main body comprises a cylinder-like base portion and a ring-like first flange;
the first flange extends from the base portion in a direction toward the terminal board;
the first groove penetrates the first flange.

17. The secondary battery according to claim 15, wherein the connection member further comprises a ring-like third flange connected to the main body and extending in a direction away from the electrode terminal, the third flange is connected with the cap plate.

18. The secondary battery according to claim 15, wherein the fixing member comprises an isolation portion and a peripheral portion connected to each other, the isolation portion is located between the terminal board and the main body of the connection member, the peripheral portion is located at a side of the connection member away from the terminal board, and the isolation portion intersects with the peripheral portion at the first groove.

19. An apparatus, comprising the secondary battery according to claim 15, wherein the secondary battery is configured to provide power for the apparatus.

20. The cap assembly according to any one of claim 1, wherein the first groove extends to an edge of the first flange away from the base portion.

* * * * *